US008314802B2

(12) United States Patent
Pyo

(10) Patent No.: US 8,314,802 B2
(45) Date of Patent: Nov. 20, 2012

(54) DISPLAY APPARATUS AND CONTROL METHOD THEREOF

(75) Inventor: Se-jin Pyo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 982 days.

(21) Appl. No.: 11/960,796

(22) Filed: Dec. 20, 2007

(65) Prior Publication Data

US 2009/0027413 A1 Jan. 29, 2009

(30) Foreign Application Priority Data

Jul. 25, 2007 (KR) ........................ 10-2007-0074302

(51) Int. Cl.
*G06F 15/00* (2006.01)
*G06T 1/00* (2006.01)
*G09G 3/28* (2006.01)
*G09G 3/30* (2006.01)

(52) U.S. Cl. ............................. 345/501; 345/63; 345/77

(58) Field of Classification Search .................. 345/501, 345/42, 63, 77

See application file for complete search history.

(56) References Cited

U.S. PATENT DOCUMENTS 4,905,033 A * 2/1990 Ishida et al. .................... 396/96
5,043,821 A * 8/1991 Suga et al. .................... 348/320
5,065,232 A * 11/1991 Kondo ....................... 348/224.1
5,194,943 A * 3/1993 Tomita et al. ................. 348/255
5,202,756 A * 4/1993 Sasaki et al. ............... 348/223.1
5,530,474 A * 6/1996 Takei ......................... 348/224.1
5,568,194 A * 10/1996 Abe ........................... 348/223.1
5,570,128 A * 10/1996 Kawahara .................. 348/222.1
5,619,229 A * 4/1997 Kumaki ........................ 345/690
5,748,307 A * 5/1998 Nakamura et al. ............ 358/296
6,108,037 A * 8/2000 Takei ......................... 348/224.1
6,184,940 B1 * 2/2001 Sano ............................ 348/655
6,363,220 B1 * 3/2002 Ide ................................ 396/98
6,885,382 B1 * 4/2005 Matsuzaki et al. ............ 345/600
2004/0036898 A1 * 2/2004 Takahashi ...................... 358/1.9
2005/0001912 A1 * 1/2005 Hoshuyama .................. 348/272
2005/0030264 A1 * 2/2005 Tsuge et al. ..................... 345/76
2005/0168645 A1 * 8/2005 Yamazaki ..................... 348/655
2005/0237412 A1 * 10/2005 Shiohara et al. ......... 348/333.11
2005/0276502 A1 * 12/2005 Brown et al. ................. 382/254
2006/0007067 A1 * 1/2006 Baek ............................... 345/63
2006/0181565 A1 * 8/2006 Arazaki ........................... 347/19
2007/0229676 A1 * 10/2007 Tanaka et al. .............. 348/223.1
2008/0007565 A1 * 1/2008 Nogawa et al. ............... 345/597
2008/0068405 A1 * 3/2008 Kumakura et al. ........... 345/690
2009/0244107 A1 * 10/2009 Kimura et al. ................ 345/690

FOREIGN PATENT DOCUMENTS

JP 2001-175220 A 6/2001
KR 10-2005-0023748 A 3/2005

* cited by examiner

*Primary Examiner* — David T Welch
(74) *Attorney, Agent, or Firm* — Sughrue Mion, PLLC

(57) ABSTRACT

There are provided a display apparatus and a control method thereof. The display apparatus includes: a display unit displaying an image; an image processing unit which processes an input image signal of a predetermined initial data bit and provides the processed image signal to the display unit; a storage unit which stores a predetermined coefficient of color temperature; and a controller which controls the image processing unit to convert the input image signal to an image signal of a first data bit bigger than the initial data bit and to multiply the image signal of the first data bit by the color temperature coefficient.

11 Claims, 8 Drawing Sheets

DISPLAY APPARATUS AND CONTROL METHOD THEREOF

CROSS-REFERENCE TO RELATED APPLICATIONS

This application claims priority from Korean Patent Application No. 10-2007-0074302, filed on Jul. 25, 2007 in the Korean Intellectual Property Office, the disclosure of which is incorporated herein by reference.

BACKGROUND OF INVENTION

1. Field of Invention

Apparatuses and methods consistent with the present invention relate to a display apparatus and a control method thereof, and more particularly, to a display apparatus and a control method thereof that improves adjustment of a color temperature.

2. Description of Related Art

A display apparatus such as a television set can set a color temperature of an image displayed. Specifically, the display apparatus can adjust the color temperature by adjusting a ratio of an image signal's red (R), green (G) and blue (B) brightness. Generally, the color temperature of the display apparatus can be varied in a range between 6,000K and 12,000K.

As illustrated in FIG. 1, a plasma display panel (PDP) television set 10 includes gain adjusting units 11, 12 and 13, an inverse gamma compensating unit 20, an average picture level (APL) adjusting unit 30, a light emitting number determining unit 40, a driving unit 50 and a PDP 60. The gain adjusting units 11, 12 and 13 adjust gains of respective R, G and B channels of an input image signal for application of color temperature. The inverse gamma compensating unit 20 performs an inverse gamma compensation to linearly compensate an output brightness compared to an input brightness of the image signal. The APL adjusting unit 30 calculates an APL value of the input image signal and provides it to the light emitting number determining unit 40. The light emitting number determining unit 40 determines a light emitting number of a PDP device corresponding to the APL value and the brightness of the respective R, G and B channels.

FIG. 2A is a graph illustrating output data of a display apparatus using a conventional color temperature adjusting method. A horizontal axis represents input brightness and a vertical axis represents output brightness. The display apparatus adjusts the color temperature of an image signal inputted through the gain adjusting units 11, 12 and 13. Specifically, after determining the ratio of the respective R, G and B channels with respect to a target color temperature, the gain adjusting units 11, 12 and 13 multiplies the R, G, and B brightness values by color temperature coefficients wr, wg and wb, respectively.

However, such a conventional display apparatus has a problem that the color temperature may be distortedly expressed due to a quantization error produced when the color temperature is adjusted. In the display apparatus like a digital television set and so on, the quantization error is likely to occur during a digitalizing process of the image signal. As illustrated in FIG. 2B, the output brightness of Yr, Yg and Yb corresponds with R, G and B respectively when the input brightness is X. However, Yg does not accord with a discrete value differently from Yr or Yb, the output brightness Yg is determined as its adjacent value Y1 or Y2. That is, in the case that the output brightness value does not accord with the digitalized value in the process of applying the color temperature to the image signal, the quantization error occurs. Such a quantization error results in deterioration in an image quality and a gray scale expression due to a distortion of the color temperature.

SUMMARY OF INVENTION

Accordingly, it is an aspect of the present invention to provide a display apparatus and a control method thereof that reduces a quantization error when applying a color temperature and enhances an image quality.

Another aspect of the present invention to provide a display apparatus and a control method thereof that performs noise shaping when reducing data bit of an image signal and minimizes deterioration of a gray scale expression.

Additional aspects and/or advantages of the present invention will be set forth in part in the description which follows and, in part, will be obvious from the description, or may be learned by practice of the present invention.

The foregoing and/or other aspects of the present invention can be achieved by providing a display apparatus including: a display unit displaying an image; an image processing unit which processes an input image signal of a predetermined initial data bit and provides the processed image signal to the display unit; a storage unit which stores a predetermined coefficient of color temperature; and a controller which controls the image processing unit to convert the input image signal to an image signal of a first data bit bigger than the initial data bit and to multiply the image signal of the first data bit by the color temperature coefficient.

The controller may obtain an average picture level of the input image signal and control the image processing unit to multiply the image signal of the first data bit by the average picture level.

The controller may control the image processing unit to convert the image signal of the first data bit to an image signal of a second data bit smaller than the first data bit while noise shaping the image signal of the first data bit.

The image processing unit may include a final brightness determining unit which determines a final brightness outputted in the display unit corresponding to the image signal of the second data bit.

The image processing unit may further include an inverse gamma compensating unit which converts a gamma characteristic of the input image signal to a linear form.

The display apparatus may further include a user input unit, and the color temperature may be inputted through the user input unit.

The display unit may include a plasma display panel.

The foregoing and/or other aspects of the present invention can be also achieved by providing a control method of a display apparatus, including: converting an input image signal of a predetermined initial data bit to an image signal of a first data bit bigger than the initial data bit; and multiplying the image signal of the first data bit by a predetermined coefficient of color temperature.

The control method of the display apparatus may further include: obtaining an average picture level of the input image signal and multiplying the image signal of the first data bit by the average picture level.

The control method of the display apparatus may further include: converting the image signal of the first data bit to an image signal of a second data bit smaller than the first data bit while noise shaping the image signal of the first data bit.

The control method of the display apparatus may further include: determining a final brightness corresponding to the image signal of the second data bit.

The control method of the display apparatus may further include: converting a gamma characteristic of the input image signal to a linear form.

The color temperature may be inputted from a user.

BRIEF DESCRIPTION OF DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 1:
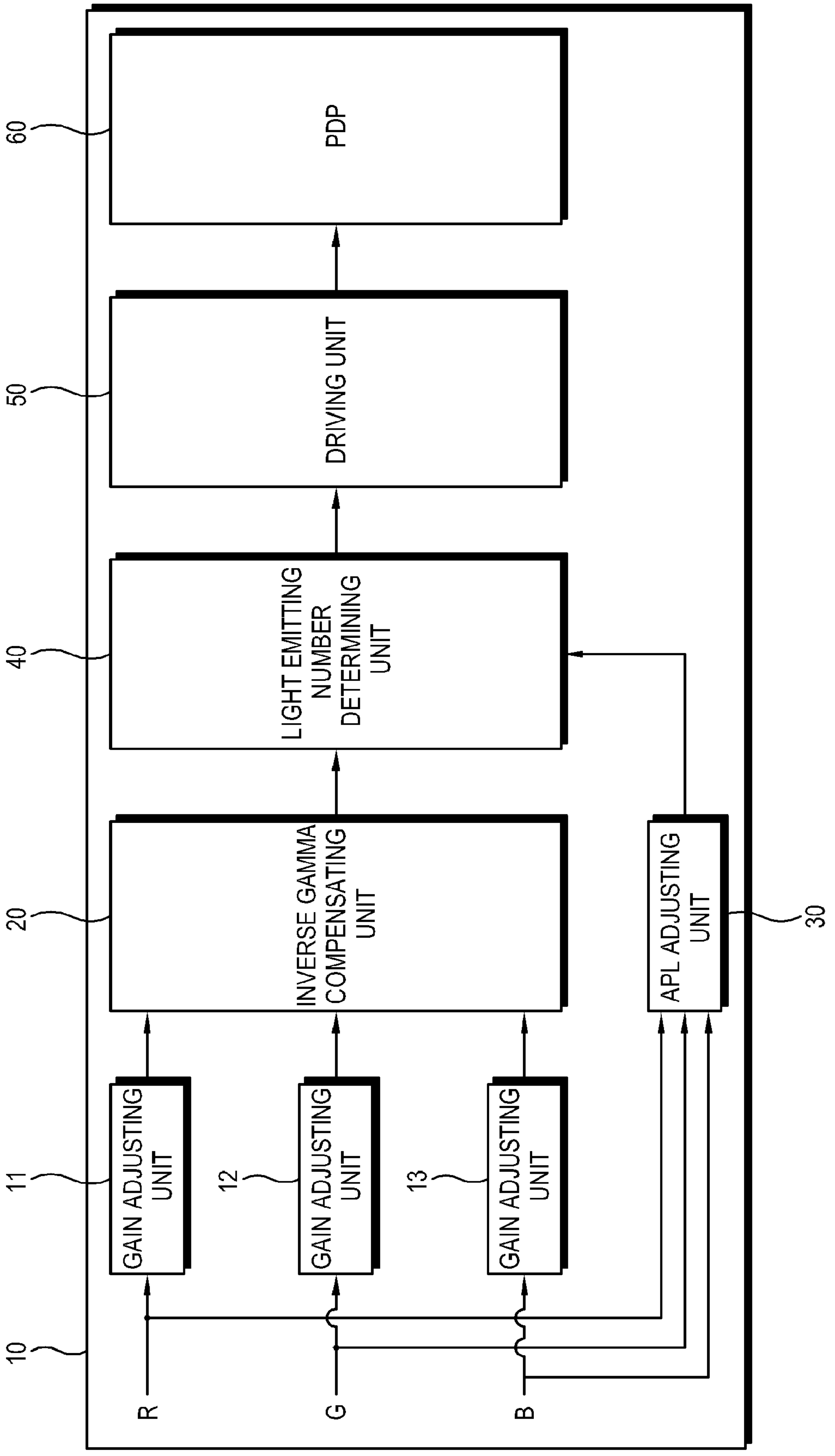
FIG. 1 (RELATED ART)
FIG. 1 is a block diagram illustrating a conventional display apparatus.
Figure 2A:
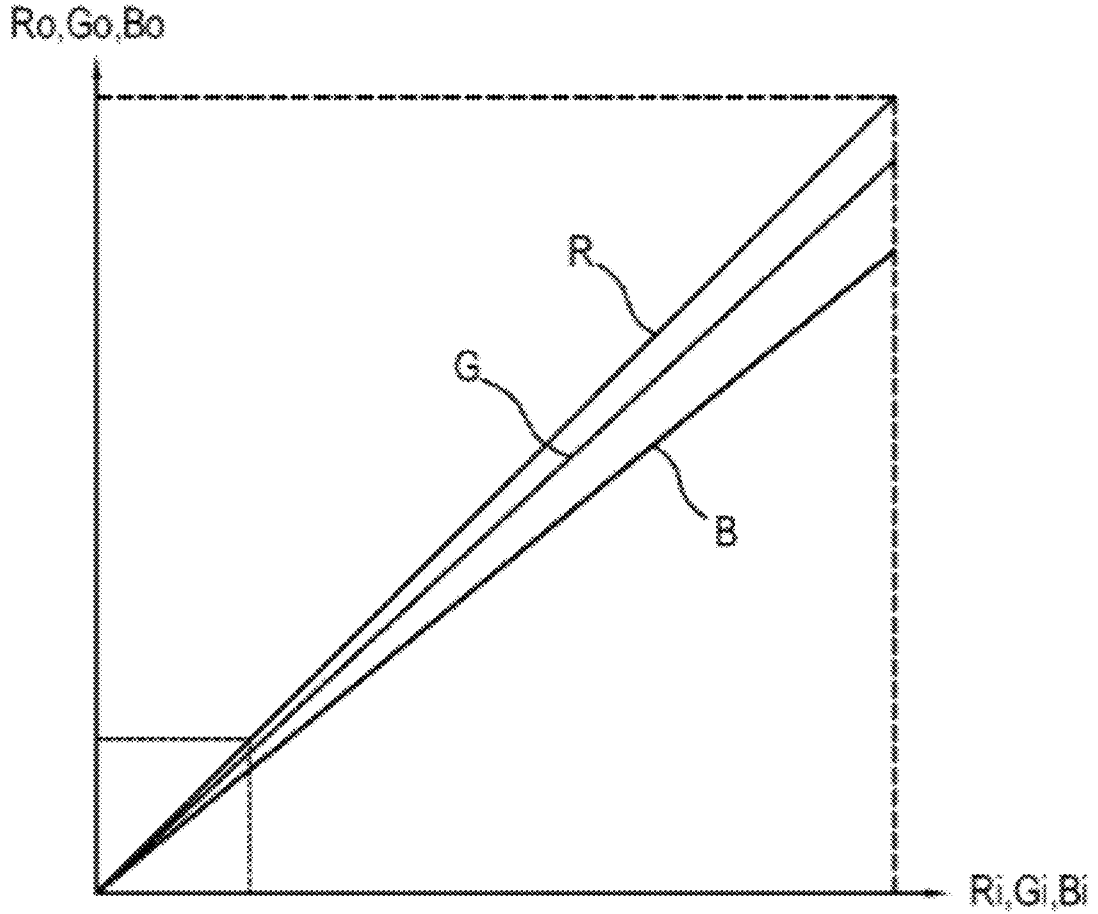
FIG. 2A (RELATED ART)
FIG. 2A is a graph representing respective R, G and B gains applied with a color temperature.
Figure 2B:
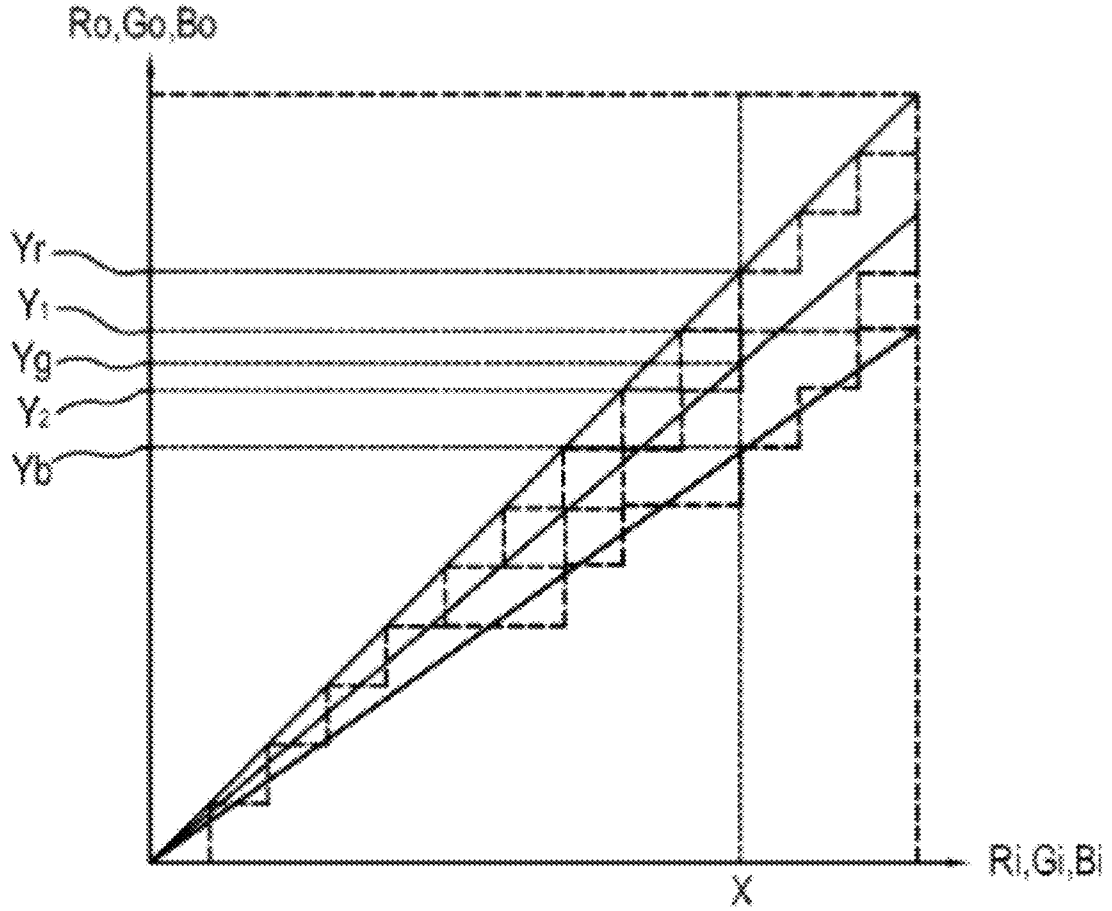
FIG. 2B (RELATED ART)
FIG. 2B illustrates a quantization error produced in R, G and B signals applied with the color temperature.
Figure 3:
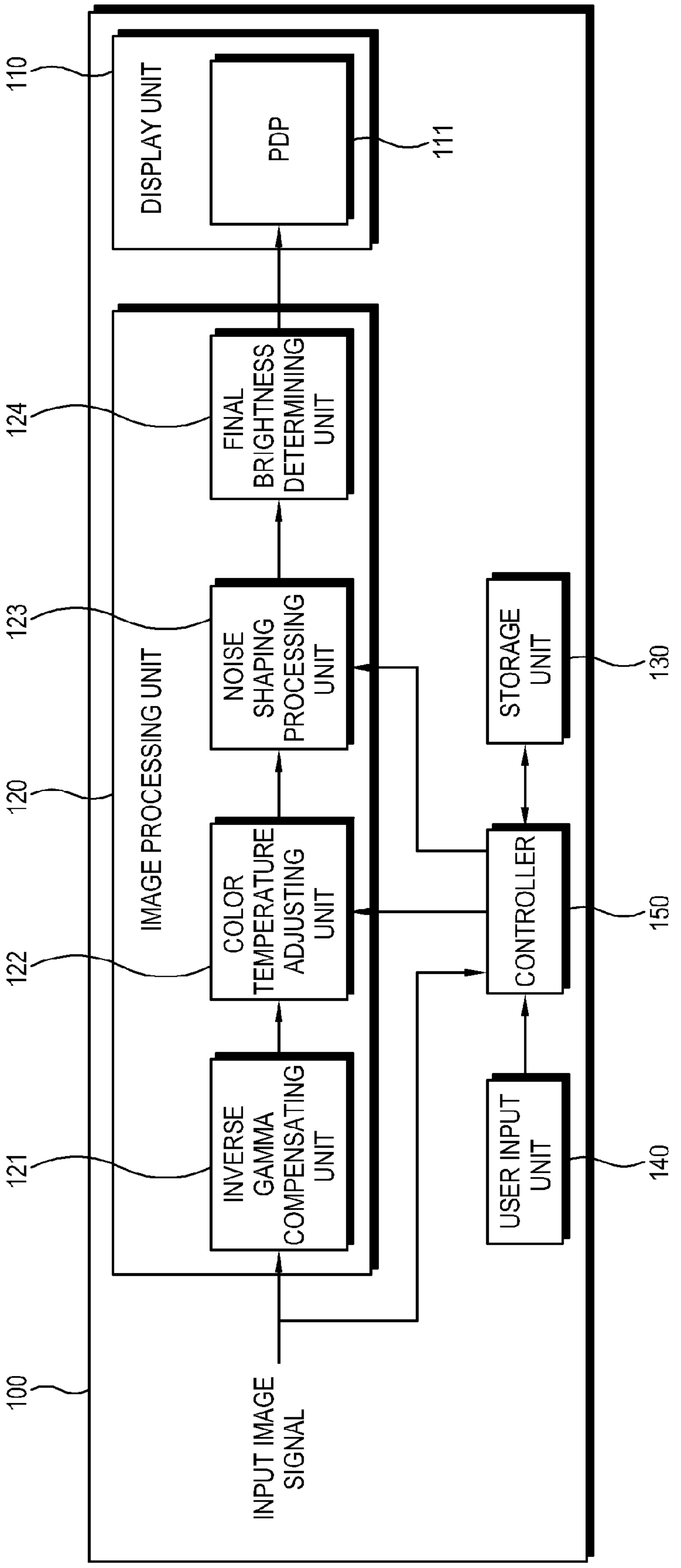
FIG. 3 is a block diagram illustrating a display apparatus according to an exemplary embodiment of the present invention.

FIG. 3 illustrates a schematic configuration of a display apparatus 100 according to an exemplary embodiment of the present invention. The display apparatus 100 can be provided as a television set and so on, and expresses a color temperature. Specifically, the display apparatus 100 expresses the color temperature by multiplying respective R, G and B image signals by a predetermined coefficient of color temperature.

As illustrated in FIG. 3, the display apparatus 100 includes an image processing unit 120, a display unit 110, a storage unit 130, a user input unit 140 and a controller 150.

The display unit 110 displays a picture image. The display unit 110 may include a PDP 111. The PDP displays the picture image through a gas electric discharge in a device by an electric drive. Here, brightness is proportional to a light emitting number of the device.

The image processing unit 120 processes an input image signal having a predetermined initial data bit and provides it to the display unit 110. The image processing unit 120 performs inverse gamma compensation, color temperature adjusting and noise shaping, according to a control of the controller 150. For example, the input image signal is a 10 bit digital image signal inputted to the image processing unit 120.

The image processing unit 120 includes an inverse gamma compensating unit 121, a color temperature adjusting unit 122, a noise shaping processing unit 123 and a final brightness determining unit 124. The inverse gamma compensating unit 121 converts a gamma characteristic of the input image signal to a linear type. The color temperature adjusting unit 122 converts the input image signal to an image signal of a first data bit larger than the initial data bit, and multiplies the image signal of the first data bit by the predetermined color temperature coefficients, according to a control of the controller 150. For example, the initial data bit may be of x bits and the first data bit may be of y bits, and since the first data bit is larger than the initial data bit, y is greater than x. The noise shaping processing unit 123 noise shapes the image signal of the first data bit and converts it to an image signal of a second data bit smaller than the first data bit, according to a control of the controller 150. The final brightness determining unit 124 determines a final brightness outputted to the display unit 110 corresponding to brightness of the image signal of the second data bit.

The storage unit 130 stores the predetermined color temperature coefficients. A color temperature may be inputted through the user input unit 140. For example, the storage unit 130 may stores a numerical value of the color temperature like 6500K, 9300K and so on, and coefficients of R, G, and B according to the color temperature. The storage unit 130 may be provided as a non-volatile memory.

The user input unit 140 receives an order from a user. For example, the user input unit may be provided as a remote controller, a control panel, a touch screen, or the like. The display apparatus 100 may display a color temperature list of 6500K, 9300K and so on in on screen display (OSD), and in this regard, the color temperature may be selected or inputted by a user through the user input unit 140.

The controller 150 controls the image processing unit 120 to convert the input image signal to the image signal of the first data bit larger than the initial data bit and to multiply the image signal of the first data bit by the predetermined color temperature coefficients.

Figure 4:
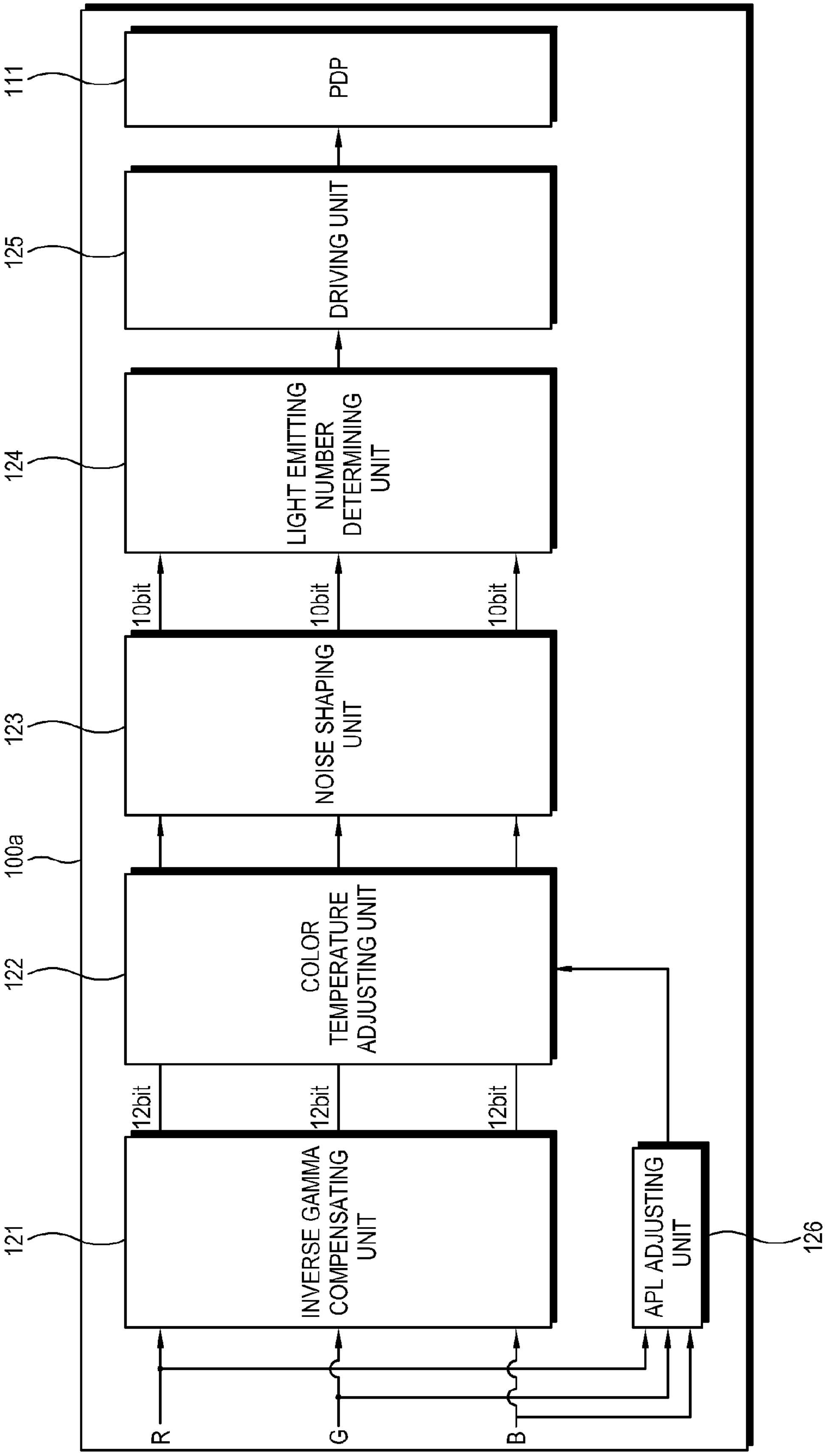
FIG. 4 is a block diagram illustrating a PDP display apparatus according to an exemplary embodiment of the present invention.

As illustrated in FIG. 4, the input image signal having the initial data bit of 10 bit is compensated linearly through the inverse gamma compensating unit 121. Next, a PDP display apparatus **100*a* converts the 10 bit image signal into the first data bit of 12 bit. By increasing the data bit, a precision of operation is enhanced and a quantization error during digitalizing the operation result can be reduced. The PDP display apparatus 100*a*** applies the color temperature to the image signal increased in data bit. That is, the respective R, G, and B of the 12 bit image signal are multiplied by the predetermined color temperature coefficients.

The inverse gamma compensation may be performed before or after the application of the color temperature to the image signal. The PDP display apparatus **100*a* may use the method of increasing the data bit in order to minimize the quantization error when performing the inverse gamma compensation. In this case, an image signal outputted from the inverse gamma compensating unit 121** is an image signal of 12 bit.

The controller 150 may obtain an average picture level and control the image processing unit 120 to multiply the image signal of the first data bit by the average picture level. The average picture level is an average of all pixel brightness expressed in one frame.

As illustrated in FIG. 4, an APL adjusting unit 126 calculates the average picture level of the input image signal and provides it to a color temperature adjusting unit 122. The color temperature adjusting unit 122 processes a multiplication of the average picture level together with the multiplication of the color temperature coefficients. Through the multiplication of the average picture level, the maximum brightness of the image signal can be decreased.

Figure 5:
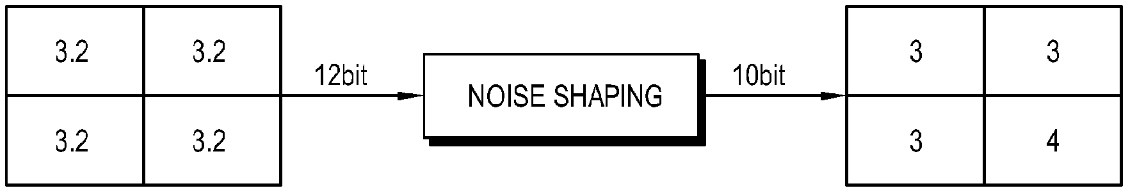
FIG. 5 illustrates a process of noise shaping an image signal.

The controller 150 controls the image processing unit 120 to convert the image signal of the first data bit to the image signal of the second data bit smaller than the first data bit through noise shaping. The noise shaping is similar to a dithering or an error spreading method of algorithm for minimizing an error produced when the data bit is reduced. As an example of the noise shaping, as illustrated in FIG. 5, if 4 pixels configuring a part of the frame have a brightness value 3.2, 3 pixels have a brightness value 3 and 1 pixel has a brightness value 4 after going through the noise shaping. In other words, the noise shaping spreads an error produced in the pixels at a small region which is difficult for naked eyes to perceive to the surrounding pixels. A user viewing the image formed of such pixels perceives the corresponding part brightness value between 3 and 4.

As illustrated in FIG. 4, a light emitting number determining unit 124 determines a light emitting number of a PDP device based on the image signal processed previously and provides it to a driving unit 125. The data bit of 12 bit image signal goes through a noise shaping unit 123 to be reduced to 10 bit, to minimize an error. However, if the driving unit 125 can process an image signal of 12 bit, the noise shaping is not necessary.

Figure 6:
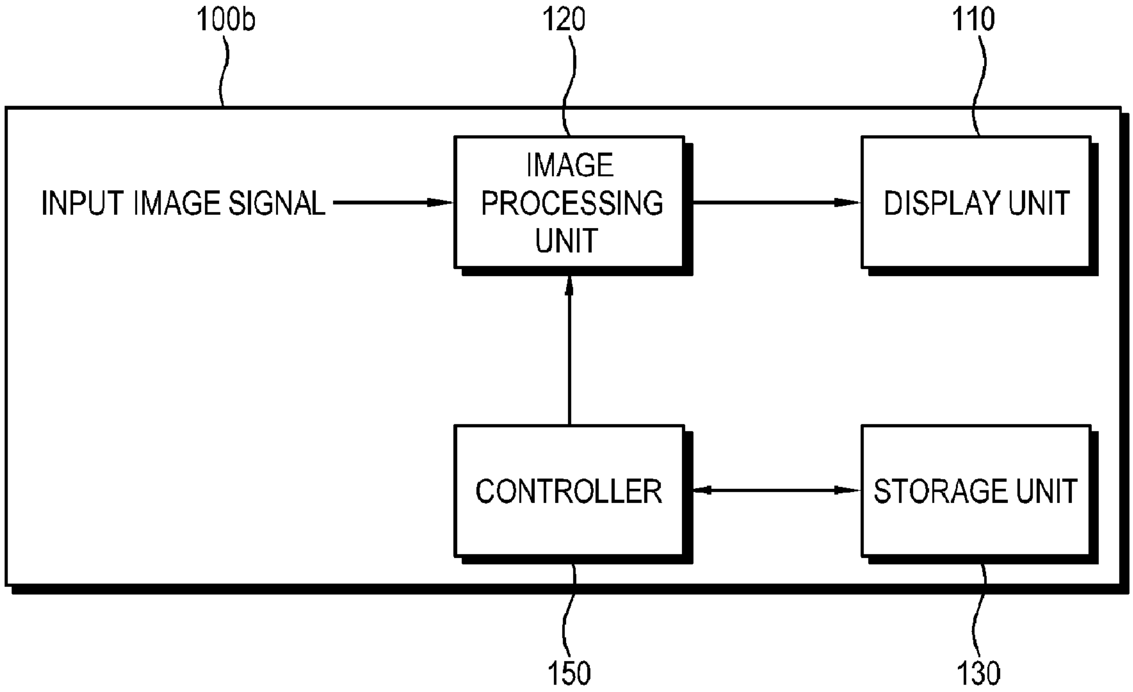
FIG. 6 is a block diagram illustrating a display apparatus according to another exemplary embodiment of the present invention.

FIG. 6 is a block diagram illustrating a configuration of a display apparatus 100*b* according to another exemplary embodiment of the present invention. As illustrated in FIG. 6, the display apparatus 100*b* may include a display unit 110, an image processing unit 120, a storage unit 130 and a controller 150. Since the elements of the display apparatus 100*b* are the same as those of the display apparatus 100 in FIG. 3, detailed description thereto is omitted.

Figure 7:
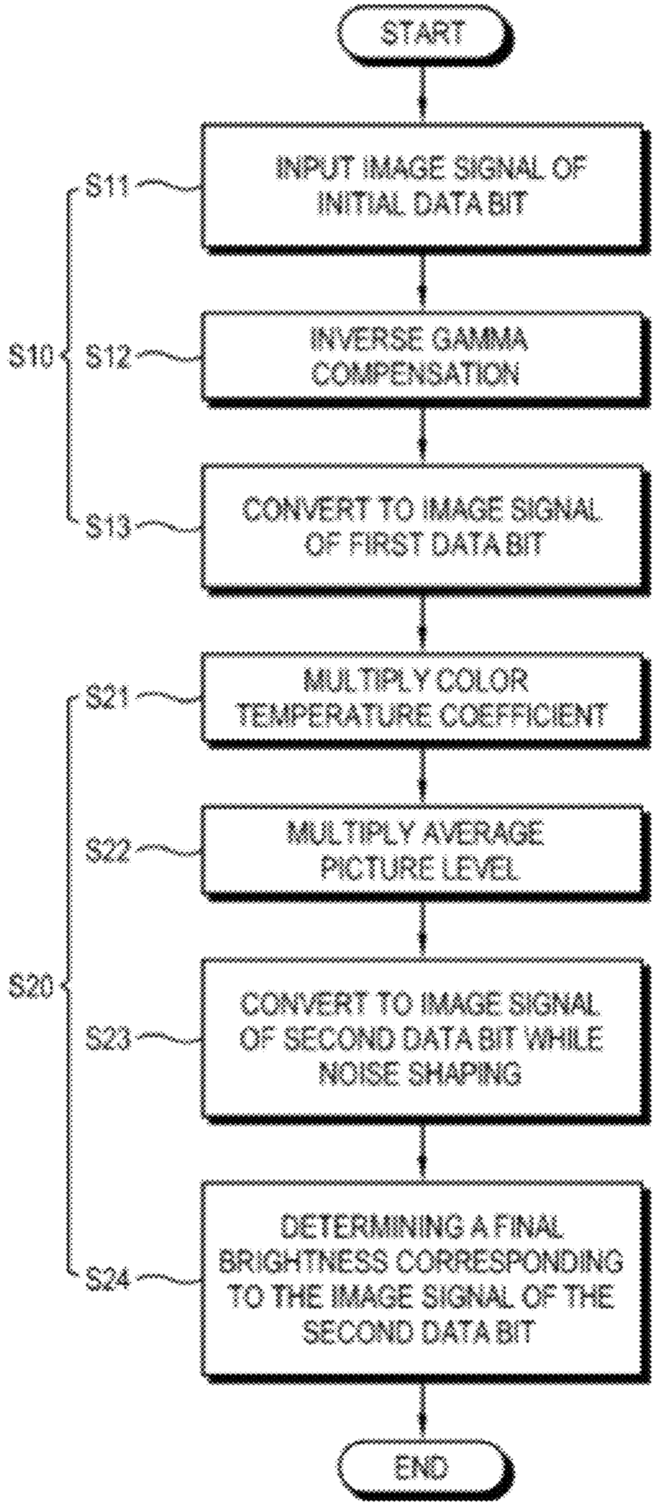
FIG. 7 is a flow chart illustrating an operation of the display apparatus according to the exemplary embodiment of the present invention.

Hereinafter, a control method of the display apparatus 100 according to the exemplary embodiment of the present invention will be described referring to FIG. 7.

The display apparatus 100 converts the input image signal having a predetermined initial data bit to the image signal having the first data bit larger than the initial data bit (S10). The display apparatus 100 multiplies the image signal of the first data bit by the predetermined color temperature coefficient (S20).

Specifically, the operation S10 includes S11, S12 and S13. The display apparatus 100 receives the image signal of the initial data bit (S11). For example, the input image signal is the digital image signal of 10 bit inputted from the image processing unit 120.

The display apparatus 100 performs the inverse gamma compensation converting a gamma characteristic of the input image signal to the linear form (S12). The inverse gamma compensation may be performed before or after applying the color temperature to the image signal. The inverse gamma compensating unit 121 may use the method of increasing the data bit to minimize the quantization error at the time of the inverse gamma compensation.

The display apparatus 100 converts the input image signal to the image data signal of the first data bit larger than the initial data bit (S13). For example, the display apparatus 100 converts the image signal of 10 bit to the image signal of the first data bit of 10 bit. By increasing the data bit, a precision of operation is enhanced and the quantization error during digitalizing the operation result can be reduced.

Next, the operation S20 includes S21, S22, S23 and S24. The display apparatus 100 multiplies the image signal of the first data bit by the predetermined color temperature coefficient (S21). The color temperature adjusting unit 122 multiplies the respective R, G and B of the image signal by the predetermined color temperature coefficients.

The display apparatus 100 obtains the average picture level of the input image signal and multiplies the image signal of the first data bit by the average picture level (S22). The display apparatus 100 converts the image signal of the first data bit to the image signal of the second data bit smaller than the first data bit while noise shaping the image signal of the first data bit. For example, the image signal of 12 bit is reduced to the data bit of 10 bit through the noise shaping processing unit 123 to minimize an error.

The display apparatus 100 determines the final brightness corresponding to the image signal of the second data bit (S24). For example, the final brightness determining unit 124 determines the brightness outputted in the display unit 110 based on the image signal processed previously.

As described above, the display apparatus according to the present invention improves an image quality through reducing the quantization error when applying the color temperature.

Also, deterioration of the gray scale expression is minimized through noise shaping when reducing data bit of the image signal.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a display unit;

an image processing unit which processes an input image signal of an initial data bit and provides the processed input image signal to the display unit;

a storage unit which stores a coefficient of color temperature; and a controller which obtains an average picture level of the input image signal, and controls the image processing unit to convert the input image signal to an image signal of a first data bit larger than the initial data bit, to multiply the image signal of the first data bit by the color temperature coefficient, and to further multiply the image signal of the first data bit by the obtained average picture level, wherein the controller controls the image processing unit to convert the image signal of the first data bit to an image signal of a second data bit smaller than the first data bit while noise shaping the image signal of the first data bit by adjusting brightness values of the image signal of the first data bit.

2. The display apparatus according to claim 1, wherein the image processing unit comprises a final brightness determining unit which determines a final brightness outputted in the display unit corresponding to the image signal of the second data bit.

3. The display apparatus according to claim 1, wherein the image processing unit further comprises an inverse gamma compensating unit which converts a gamma characteristic of the input image signal to a linear form.

4. The display apparatus according to claim 1, further comprising a user input unit, wherein the color temperature is inputted through the user input unit.

5. The display apparatus according to claim 1, wherein the display unit comprises a plasma display panel.

6. The display apparatus according to claim 1, wherein the initial data bit is x bits and the first data bit is y bits, and y is greater than x.

7. A control method of a display apparatus, comprising:

converting an input image signal of an initial data bit to an image signal of a first data bit larger than the initial data bit;

obtaining an average picture level of the input image signal;

multiplying the image signal of the first data bit by a coefficient of color temperature and further multiplying the image signal of the first data bit by the obtained average picture level, and converting the image signal of the first data bit to an image signal of a second data bit smaller than the first data bit while noise shaping the image signal of the first data bit by adjusting brightness values of the image signal of the first data bit.

8. The control method of the display apparatus according to claim 7, further comprising:

determining a final brightness corresponding to the image signal of the second data bit.

9. The control method of the display apparatus according to claim 7, further comprising:

converting a gamma characteristic of the input image signal to a linear form.

10. The control method of the display apparatus according to claim 7, wherein the color temperature is inputted by a user.

11. The control method of the display apparatus according to claim 7, wherein the initial data bit is x bits and the first data bit is y bits, and y is greater than x.

* * * * *